United States Patent
Liu et al.

(10) Patent No.: US 10,106,696 B2
(45) Date of Patent: Oct. 23, 2018

(54) INKJET INK COMPOSITIONS

(71) Applicant: Cabot Corporation, Boston, MA (US)

(72) Inventors: Tianqi Liu, Boxborough, MA (US);
Robert J. Anderson, Lowell, MA (US);
Jinqi Xu, Westford, MA (US); Jodi A. Bates, Chelmsford, MA (US); Paul S. Palumbo, Newton, MA (US)

(73) Assignee: Cabot Corporation, Boston, MA (US)

( * ) Notice: Subject to any disclaimer, the term of this patent is extended or adjusted under 35 U.S.C. 154(b) by 37 days.

(21) Appl. No.: 15/354,284

(22) Filed: Nov. 17, 2016

(65) Prior Publication Data

US 2017/0137650 A1    May 18, 2017

Related U.S. Application Data

(60) Provisional application No. 62/256,905, filed on Nov. 18, 2015.

(51) Int. Cl.
| | |
|---|---|
| *C09D 11/324* | (2014.01) |
| *C09D 125/14* | (2006.01) |
| *C09D 11/107* | (2014.01) |
| *C09C 1/48* | (2006.01) |
| *C09C 1/50* | (2006.01) |
| *C09D 11/102* | (2014.01) |
| *C09D 11/106* | (2014.01) |

(52) U.S. Cl.
CPC .............. *C09D 11/324* (2013.01); *C09C 1/48* (2013.01); *C09C 1/50* (2013.01); *C09D 11/102* (2013.01); *C09D 11/106* (2013.01); *C09D 11/107* (2013.01); *C09D 125/14* (2013.01)

(58) Field of Classification Search
CPC .... C09D 11/324; C09D 11/107; C09D 125/14
See application file for complete search history.

(56) References Cited

U.S. PATENT DOCUMENTS

| | | |
|---|---|---|
| 2014/0013996 A1 | 1/2014 | Dikan et al. |
| 2014/0251179 A1 | 9/2014 | Liu et al. |

FOREIGN PATENT DOCUMENTS

| | | | |
|---|---|---|---|
| JP | 2010-018741 | * | 1/2010 |
| JP | 2010018741 A | | 1/2010 |

OTHER PUBLICATIONS

"ASTM D 2414-09a—Standard Test Method for Carbon Black—Oil Absorption Number (OAN)", Annual Book of ASTM Standards—vol. 09.01, *Rubber, Natural and Synthetic—General Test Methods; Carbon Black*, ASTM, USA, pp. 451-457.
International Search Report and the Written Opinion of the International Searching Authority, or the Declaration, for International Application No. PCT/US2016/062470, dated Feb. 15, 2017.

\* cited by examiner

*Primary Examiner* — Robert D Harlan

(57) ABSTRACT

Disclosed herein inkjet ink compositions comprising: (a) a carbon black having the following properties: OAN≥170 mL/100 g; and STSA ranging from 160 to 220 m²/g; (b) at least one polymeric dispersant selected from polyoxyethylene/polyoxypropylene block copolymers, styrene-acrylic resins, styrene-methacrylic resins, styrene-maleic acid copolymers, and styrene-maleic anhydride copolymers; (c) at least one surfactant selected from ethoxylated siloxanes, succinic acid esters, and succinic acid salts; and (d) at least one polyurethane.

29 Claims, No Drawings

INKJET INK COMPOSITIONS

RELATED APPLICATION

This application claims priority under 35 U.S.C. § 119 (e) to U.S. Prov. Appl. No. 62/256,905, filed Nov. 18, 2015, the disclosure of which is incorporated herein by reference.

FIELD OF THE INVENTION

Disclosed herein are inkjet ink compositions comprising high structure carbon blacks.

BACKGROUND

There is a continual need for new carbon black materials to enhance inkjet printing performance in a number of applications. For example manufacturers seek improved optical density of the printed product, e.g., as new paper types and printers are developed.

DETAILED DESCRIPTION

One embodiment provides an inkjet ink composition comprising:
(a) a carbon black having the following properties:
OAN≥170 mL/100 g; and
STSA ranging from 160 to 220 $m^2/g$;
(b) at least one dispersing agent selected from polyoxyethylene/polyoxypropylene block copolymers, styrene-acrylic resins, styrene-methacrylic resins, styrene-maleic acid copolymers, and styrene-maleic anhydride copolymers;
(c) at least one surfactant selected from ethoxylated siloxanes, succinic acid esters, and succinic acid salts; and
(d) at least one polyurethane.

In one embodiment, the carbon blacks are channel blacks, furnace blacks and lamp blacks. In one embodiment, the carbon blacks disclosed herein are furnace blacks. In one embodiment, the reactor for preparing furnace carbon blacks black is a multi-stage reactor, such as those described in U.S. Pat. No. 7,829,057 or U.S. Pub. No. 2007/0104636, the disclosures of which are incorporated herein by reference. As used herein, a "multi-stage reactor" is outfitted with two or more feedstock injection locations, with subsequent injection locations(s) being positioned downstream a first injection location. In one embodiment, the carbon blacks disclosed herein can be prepared as described in U.S. Pat. No. 9,056,994, the disclosure of which is incorporated herein by reference.

In one embodiment, the carbon blacks are useful as pigments in, e.g., inkjet ink compositions. In printing applications, there is a continuing need to develop pigments and ink formulations that, when deposited on a substrate such as paper, produce a printed product having high optical density (O.D.). Often, high O.D. is associated with larger sized particles as these have a lesser tendency to penetrate the pores of the paper. However, larger sized particles generally trend toward poorer sedimentation performance, a disadvantageous property for long term storage of inkjet ink formulations, e.g., in cartridges. It has been discovered that a combination of larger oil absorption number (OAN) and statistical thickness surface area (STSA) values (e.g., within a range of BET surface area values) can achieve the compromise between O.D. and sedimentation.

In one embodiment, the OAN ranges from 170 to 220 mL/100 g, e.g., from 170 to 210 mL/100 g, from 180 to 220 mL/100 g, from 180 to 210 mL/100 g, from 190 to 220 mL/100 g, or from 190 to 210 mL/100 g. OAN can be determined according to ASTM-D2414. Without wishing to be bound by any theory, it is believed that the disclosed OAN values can be a significant factor in achieving high optical density values.

In one embodiment, the STSA ranges from 160 to 220 $m^2/g$, e.g., from 160 to 210 $m^2/g$, and in certain applications, the STSA ranges from 170 to 220 $m^2/g$, from 170 to 210 $m^2/g$, from 180 to 220 $m^2/g$, or from 180 to 220 $m^2/g$. In one embodiment, the STSA ranges from 130 $m^2/g$ to 220 $m^2/g$, e.g., from 130 $m^2/g$ to 200 $m^2/g$. STSA values can be determined according to ASTM-D6556.

Another embodiment provides a carbon black having the following properties:
OAN≥170 mL/100 g; and
STSA ranging from 160 to 220 $m^2/g$; and
a ratio of STSA/BET ranging from 0.7 to 1.

Another embodiment provides a carbon black having the following properties:
OAN≥170 mL/100 g; and
STSA ranging from 160 to 220 $m^2/g$; and
BET surface area ranging from 190 to 275 $m^2/g$.

Without wishing to be bound by any theory, it is believed that high STSA values and a certain range of BET surface areas achieve good sedimentation performance, as indicated by lower sedimentation rates (%, as determined by the method of Example 6). In one embodiment, the BET surface area ranges from 200 to 270 $m^2/g$, such as a surface area ranging from 200 to 260 $m^2/g$. The BET surface area can be determined according to ASTM-D6556. In one embodiment, the BET surface area ranges from 150 $m^2/g$ to 260 $m^2/g$, from 150 $m^2/g$ to 220 $m^2/g$, from 160 $m^2/g$ to 260 $m^2/g$, from 160 $m^2/g$ to 220 $m^2/g$, from 170 $m^2/g$ to 260 $m^2/g$, from 170 $m^2/g$ to 220 $m^2/g$, from 180 $m^2/g$ to 260 $m^2/g$, or from 180 $m^2/g$ to 220 $m^2/g$.

Another embodiment involves the discovery that good printing and sedimentation performance can be achieved with carbon blacks having low internal volume, as determined by a ratio of STSA/BET ranging from 0.7 to 1. A ratio of STSA/BET of 1 represents the limit when the carbon black has substantially no internal porosity. In another embodiment, this range of STSA/BET ratios can be useful for applications incorporating conductive carbon blacks.

In one embodiment, the ratio of STSA/BET ranges from 0.7 to 0.9, or a ratio of STSA/BET ranging from 0.7 to 0.8. In another embodiment, the ratio of STSA/BET ranges from 0.8 to 1 or from 0.9 to 1. In one embodiment, a ratio of STSA/BET ranging from 0.7 to 1 is achieved by minimizing the etching during carbon black formation. In one embodiment, the carbon black can have the STSA and/or BET values disclosed herein.

In one embodiment, the carbon black has a compressed OAN (COAN) of at least 120 mL/100 g, e.g., at least 125 mL/100 g, at least 130 mL/100 g, at least 135 mL/100 g, or a COAN ranging from 120-145 mL/100 g. COAN values can be determined according to ASTM D 2414.

In one embodiment, the carbon black has a ratio of OAN/COAN ranging from 1.30 to 1.50, e.g., from 1.30 to 1.45.

Another embodiment relates to dispersions comprising the carbon blacks disclosed herein. The dispersion can be aqueous or nonaqueous.

In one embodiment, the carbon black is provided in the form having the consistency of, for example, a paste or putty in a solid or semi-solid form (containing aqueous and/or nonaqueous materials/solvents), a slurry in which the carbon black is provided as an aqueous or nonaqueous dispersion, or as a bulk powder that can be a free flowing or a tacky powder. In one embodiment, the carbon black, whether as a raw material, an oxidized black, or a modified black (e.g., having an attached organic group), can be provided in dry form, such as a powder, pellet, granule, or cake. In one embodiment, "dry" refers to a material being substantially free of water and optionally free of volatile material. In one embodiment, dry forms include volatile material, such as about 50% or more of a volatile solvent.

In one embodiment, the dispersion comprises pigments such as the carbon blacks disclosed herein (e.g., self-dispersed carbon blacks including oxidized carbon blacks or carbon blacks having at least one attached organic group), and a liquid vehicle, e.g., an aqueous or non-aqueous vehicle. In one embodiment, the vehicle contains water, e.g., the vehicle comprises an aqueous solution. In one embodiment, the aqueous solution contains greater than 50% by weight water and can be, for example, water or mixtures of water with water miscible solvents such as alcohols. In one embodiment, the amount of pigment present in the dispersion can be varied but is typically in an amount ranging from 0.1% to 30%, e.g., from 1% to 25%, from 1% to 20%, from 3% to 20%, from 3% to 15%, based on the total weight of the dispersion.

The self-dispersed carbon blacks (e.g., oxidized or modified carbon blacks disclosed herein) can provide useful properties when present in a dispersion. In one embodiment, the carbon black in the dispersion has a mean volume (mV) ranging from 0.07 to 0.18 µm, e.g., from 0.1 to 0.18 µm. In another embodiment, the carbon black has a D10 ranging from 0.03 to 0.1 µm, e.g., from 0.05 to 0.1 µm, such as a D10 ranging from 0.06 to 0.1 µm, or from 0.07 to 0.1 µm. In one embodiment, the carbon black has a D50 ranging from 0.07 to 0.16 µm, e.g., from 0.1 to 0.16 µm. In another embodiment, the carbon black has a D90 ranging from 0.15 to 0.25 µm, e.g., from 0.18 to 0.25 µm, such as a D90 ranging from 0.15 to 0.24 µm, or a D90 ranging from 0.18 to 0.24 µm.

The dispersion can be prepared by using any method known in the art. For example, the modified pigment in a dry form may be combined with the liquid vehicle with agitation to produce a stable dispersion. Any equipment known in the art, such as a media or ball mill, or other high shear mixing equipment can be used, and various conventional milling media may also be used. Other methods for forming the dispersion will be known to one skilled in the art.

Another embodiment provides inkjet ink compositions comprising the dispersions disclosed herein. The amount of modified pigment used in the inkjet ink composition can be varied but is typically in an amount effective to provide the desired image quality (for example, optical density) without detrimentally affecting the performance of the inkjet ink. In one embodiment, the pigment such as the carbon blacks disclosed herein (e.g., oxidized carbon blacks or carbon blacks having at least one attached organic group) is present in the inkjet ink composition in an amount ranging from 0.1% to 20%, e.g., from 1% to 20%, from 1% to 10%, or from 3% to 8%, based on the total weight of the inkjet ink composition.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution.

In one embodiment, the composition comprises at least one dispersant, e.g., at least one polymeric dispersant. In one embodiment, the at least one polymeric dispersant can be provided as aqueous dispersions of polymer particles, which can be formed, for example, either by dispersing polymer particles in an aqueous medium using dispersants or by forming polymer particles by polymerization in an aqueous medium. In one embodiment, the composition comprises at least one polymeric dispersant such as anionic or nonionic dispersants. Nonionic dispersants can be selected from polyoxyethylene/polyoxypropylene block copolymers. Anionic dispersants can be selected from styrene-acrylic resins and methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers. "Anionic dispersants" also encompass salts and esters thereof. In one embodiment, the at least one dispersant is selected from styrene-maleic acid copolymers and styrene-maleic anhydride copolymers.

In one embodiment, the composition comprises at least one surfactant selected from ethoxylated siloxanes, succinic acid esters, and succinic acid salts. Suitable succinic acid esters include alkylsulfosuccinic acid esters (e.g., dialkylsulfosuccinic acid esters), sulfosuccinates, alkylsulfosuccinates, and salts thereof, e.g., Aerosol® IB-45/Aerosol® TR-70 surfactants (sulfosuccinates available from Cytec Industries).

In one embodiment, the composition comprises at least one polyurethane. In one embodiment, the at least one polyurethane can be provided as an aqueous dispersion of a polymer comprising urethane groups and optionally urea groups. The at least one polyurethane may incorporate hydrophilic functionality, e.g., to maintain a stable dispersion of the polymer in water. In one embodiment, the at least one polyurethane is ionically self-stabilized, in which the polymer is predominantly stabilized in the dispersion through incorporated ionic functionality, and e.g., anionic functionality such as neutralized acid groups to form anionically self-stabilized polyurethane dispersions. One embodiment provides a self-stabilized polyurethane dispersion comprising the at least one polyurethane having ionic functionality, e.g., an anionic functionality, incorporated through the use of chain extenders having acid groups.

The at least one polyurethane can be prepared by a multi-step process in which an isocyanate (N═C═O, NCO) prepolymer is initially formed and subsequently chain extended in the aqueous phase, optionally in the presence of a polyfunctional group chain extender. The isocyanate prepolymer can also be formed by a one-step or multi-step process. The reaction components can include diisocyanates, polyols, and isocyanate-reactive compounds containing ionic groups. In one embodiment, the respective molar amounts of these components are selected based upon the ratio A:B, where A is the molar amount of isocyanate groups and B is the sum of the molar amount of the hydroxyl groups and the molar amount of the functional groups which can react with isocyanates in an addition reaction. In one embodiment, the reaction is carried out at a temperature ranging from 20° C. to 180° C., e.g., from 50 to 150° C. under atmospheric pressure. The reaction times required can range from a few minutes to a number of hours, e.g., from 1 minute to 24 hours. Those skilled in the art of polyurethane chemistry will know how the reaction time is influenced by many parameters such as temperature, concentration of the monomers and reactivity of the monomers. To accelerate the reaction of the diisocyanates, it is possible to use the customary catalysts such as dibutyltin dilaurate, tin(II) octoate or diazabicyclo[2.2.2]octane.

In one embodiment, an anionic polyurethane is prepared from the reaction components in a water-miscible solvent at a temperature below 100° C. at atmospheric pressure. In one embodiment, the reaction components are selected in such a way that the A:B ratio ranges from 0.5:1 to 2:1, e.g., from 0.8:1 to 1.5:1, or from 0.9:1 to 1.2:1. In one embodiment, the A:B ratio ranges from 0.9:1 to 1:0.9, e.g., about 1:1. In one embodiment, a prepolymer bearing isocyanate groups is first prepared between diisocyanates and polyols in a water-miscible solvent. These prepolymers can be subsequently chain extended in the presence of water by reaction of the isocyanate groups with amines bearing ionic groups and more than 2 amino groups which are reactive toward isocyanates, or amines bearing ionic groups and 2 amino groups which are reactive toward isocyanates. Sufficient water can be added to form a dispersion in which the water is the coherent phase. The solvent can be subsequently removed, e.g., distilled off.

In another embodiment, a prepolymer bearing isocyanate groups is first prepared from diisocyanates, polyols and isocyanate-reactive compounds containing ionic groups. In one embodiment, the reaction components are selected such that the A:B ratio ranges from greater than 1.0:3, e.g., from 1.05:1.5. The prepolymer is first dispersed in water and subsequently crosslinked by reaction of the isocyanate groups with amines bearing more than 2 amino groups that are reactive toward isocyanates, or is chain-extended using amines bearing 2 amino groups that are reactive toward isocyanates. In both processes, isocyanate groups are hydrolyzed to form amine groups which react with remaining isocyanate groups of the prepolymers to extend the chains.

Suitable examples of diisocyanates for reacting with the isocyanate-reactive compound containing ionic groups (or groups which can be rendered ionic, such as by neutralization) can include those containing either aromatic, cycloaliphatic or aliphatic-bound isocyanate groups. In one embodiment, the isocyanate is a cycloaliphatic or aliphatic isocyanate. Examples of suitable cycloaliphatic or aromatic diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)-cyclohexane; 1-isocyanato-2-isocyanatomethyl cyclopentane; bis-(4-isocyanatocyclohexyl)-methane; 2,4'-diisocyanato-dicyclohexyl methane; bis-(4-isocyanato-3-methyl-cyclohexyl)-methane, $\alpha,\alpha,\alpha',\alpha'$-tetramethyl-1,3- and/or -1,4-xylylene diisocyanate; 1-isocyanato-1-methyl-4(3)-isocyanatomethyl cyclohexane; and 2,4- and/or 2,6-hexahydro-toluylene diisocyanate. Suitable examples of aliphatic diisocyanates include those containing linear or branched aliphatic groups having from 4 to 12 carbon atoms, e.g., from 4 to 8 carbon atoms, or 6 carbon atoms, which include 1,4-tetramethylene diisocyanate; 1,6-hexamethylene diisocyanate; 2,2,4-trimethyl-1,6-hexamethylene diisocyanate; and 1,12-dodecamethylene diisocyanate.

Isocyanate-reactive compounds containing acid groups, such as carboxylic acid groups, carboxylate groups, sulphonic acid groups, sulphonate groups, phosphoric acid groups and phosphonate groups, can be chemically incorporated into the polyurethane to provide hydrophilicity and enable the polyurethane to be stably dispersed in an aqueous medium. Suitable compounds for incorporating carboxyl groups are described in U.S. Pat. Nos. 3,479,310, 4,108,814, and 4,408,008, which are incorporated in their entirety by reference herein. The acid salts are formed by neutralizing the corresponding acid groups either prior to, during or after formation of the isocyanate prepolymer, e.g., after formation of the isocyanate prepolymer. Suitable neutralizing agents for converting carboxylic acid groups to carboxylate salt groups are also described in the preceding U.S. patents. As used herein, the term "neutralizing agents" is meant to embrace all types of agents which are useful for converting carboxylic acid groups to hydrophilic carboxylate salt groups.

In one embodiment, carboxylic group-containing isocyanate-reactive compounds are hydroxy-carboxylic acid compounds having the formula $(HO)_x Z(COOH)_y$, wherein Z represents a straight or branched, hydrocarbon radical containing 1 to 12 carbon atoms, x is 1 or 2 (e.g., x is 2), and y is 1 to 3, e.g., y is 1 or 2 or y is 1. Examples of hydroxy-carboxylic acids include citric acid, tartaric acid and hydroxypivalic acid. In one embodiment, the hydroxy-carboxylic acids are those of the above-mentioned formula wherein x is 2 and y is 1. Dihydroxy alkanoic acids are described in U.S. Pat. No. 3,412,054, which is incorporated herein by reference. In one embodiment, the dihydroxy alkanoic acids are $\alpha,\alpha$-dimethylol alkanoic acids having the formula $Z'—C(CH_2OH)_2COOH$, wherein Z' is hydrogen or an alkyl group containing 1 to 8 carbon atoms. In one embodiment, the acid is $\alpha,\alpha$-dimethylol propionic acid (DMPA) wherein Z' is methyl in the above formula.

In one embodiment, the acid groups are incorporated in the isocyanate-reactive compound in an amount sufficient to provide an ionic group content of at least about 6, e.g., at least about 7 milligrams of KOH/gram of polyurethane resin solids. In one embodiment, the upper limit for the content of acid groups is about 100, e.g., about 80, about 70, about 40, or about 35 milligrams per 1 g of polyurethane resins solids. In one embodiment, the at least one polyurethane has an acid number ranging from about 6 to about 100 mg KOH/g polyurethane, e.g., from about 6 to about 80, from about 6 to about 70, from about 6 to about 40, or from about 6 to about 35 mg KOH/g polyurethane, or from about 24 to about 60 mg KOH/g polyurethane. This ionic group content is equivalent to an acid number for the polyurethane resin solids.

In one embodiment, suitable higher molecular weight polyols are those containing at least two hydroxy groups and having a molecular weight ranging from about 400 to about 6000, e.g., from about 800 to about 3000, or from about 1000 to about 2500. The molecular weights are number average molecular weights (Mn) and are determined by end group analysis (OH number, hydroxyl analysis). Examples of these high molecular weight compounds include polyester polyols, polyether polyols, polyhydroxy polycarbonates, polyhydroxy polyacetals, polyhydroxy polyacrylates, polyhydroxy polyester amides, polyhydroxy polyolefins, polyhydroxy polyalkylsiloxanes, and polyhydroxy polythioethers. A combination of the polyols can also be used in the polyurethane. In one embodiment, polyester polyols or polyether polyols are used.

Suitable examples of polyester polyols include the reaction products of polyhydric alcohols, such as dihydric alcohols to which trihydric alcohols may be added, and polybasic carboxylic acids, such as dibasic carboxylic acids. Also, the corresponding carboxylic acid anhydrides or polycarboxylic acid esters of lower alcohols or mixtures thereof may be used. The polycarboxylic acid component may be aliphatic, cycloaliphatic, aromatic and/or heterocyclic and they may be substituted, for example, by halogen atoms, and/or unsaturated. Specific examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate. Suitable examples of the polyhydric alcohol component include ethylene glycol, propylene glycol, butylene glycol, hexanediol, octanediol, neopentyl glycol, cyclohexanedimethanol (1,4-bis-hydroxymethyl-cyclohexane), 2-methyl-1,3-propanediol, 2,2,4-trimethyl-1,3-pentanediol, triethylene glycol, tetra-ethylene glycol, polyethylene glycol, dipropylene glycol, polypropylene glycol, dibutylene glycol, polybutylene glycol, glycerine, and trimethylol-propane. The polyesters may also contain a portion of carboxyl end groups. Polyesters of lactones, such as ε-caprolactone, or hydroxycarboxylic acids, such as ω-hydroxycaproic acid, may also be used.

Suitable examples of polycarbonates containing hydroxyl groups include the products obtained from the reaction of diols (such as propanediol, butanediol, or hexanediol), diethylene glycol, triethylene glycol or tetraethylene glycol with phosgene, diarylcarbonates such as diphenylcarbonate or with cyclic carbonates such as ethylene or propylene carbonate. Also, polyester carbonates obtained from the above-mentioned polyesters or polylactones with phosgene, diaryl carbonates or cyclic carbonates, can be used.

Suitable examples of polyether polyols include those obtained by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. In one embodiment, the polyethers do not contain more than about 10% by weight of ethylene oxide units; for example, the polyethers may be obtained without the addition of ethylene oxide. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)ethane.

In one embodiment, polyethers obtained by the reaction of starting compounds containing amine compounds can also be used. Examples of these polyethers as well as suitable polyhydroxy polyacetals, polyhydroxy polyacrylates, polyhydroxy polyester amides, polyhydroxy polyamides and polyhydroxy polythioethers include those disclosed in U.S. Pat. No. 4,701,480, the disclosure of which is incorporated herein by reference.

Suitable examples of poly(meth)acrylates containing hydroxyl groups include those prepared by addition polymerization such as cationic, anionic and radical, polymerization and the like, e.g., α-ωdiols. An example of these types of diols are those prepared by a "living" or "control" or chain transfer polymerization processes which enables the placement of one hydroxyl group at or near the termini of the polymer. U.S. Pat. Nos. 6,248,839 and 5,990,245, the disclosures of which are incorporated herein by reference, describe examples of protocols for making such terminal diols.

In one embodiment, the high molecular weight polyols that are reacted to form the prepolymer are present in the polyurethanes in an amount of at least about 5% by weight, e.g., at least about 10% by weight, based on the weight of the polyurethane. In one embodiment, the maximum amount of these polyols is about 90%, e.g., ranging from about 50 to 90%, or from about 75 to 90% by weight, based on the weight of the polyurethane.

Other optional compounds may be used for preparing the isocyanate prepolymer. These include low molecular weight, at least difunctional isocyanate-reactive compounds having an average molecular weight of up to about 400. Examples include dihydric and higher functionality alcohols, which have previously been described for the preparation of the polyester polyols and polyether polyols. Also, in addition to the above-mentioned difunctional components used in the isocyanate polyaddition reaction, mono-functional and even small portions of trifunctional and higher functional components can also be used. For example, trimethylolpropane or 4-isocyanantomethyl-1,8-octamethylene diisocyanate may be used in order to provide a slight branching of the isocyanate prepolymer or polyurethane. In one embodiment, the isocyanate prepolymers are substantially linear, and this may be achieved by maintaining the average functionality of the prepolymer starting components at or below 2:1.

Other optional compounds also include isocyanate-reactive compounds containing lateral or terminal hydrophilic ethylene oxide units. These may have a content of the hydrophilic ethylene oxide units of up to about 10%, e.g., up to about 8%, ranging from about 1 to about 6%, or ranging from about 2 to about 6%, by weight, based on the weight of the polyurethane. In one embodiment, up to about 75% of the allowable, chemically incorporated, hydrophilic ethylene oxide units may be replaced by known nonionic, external emulsifiers including, for example, alkaryl types (such as polyoxyethylene nonyl phenyl ether or polyoxyethylene octyl phenyl ether), alkyl ether types (such as polyoxyethylene lauryl ether or polyoxyethylene oleyl ether), alkyl ester types (such as polyoxyethylene laurate, polyoxyethylene oleate or polyoxyethylene stearate), and polyoxyethylene benzylated phenyl ether types. The isocyanate-reactive compounds for incorporating lateral or terminal hydrophilic ethylene oxide units may contain either one or two isocyanate-reactive groups, e.g., hydroxy groups. Examples include those described in U.S. Pat. Nos. 3,905,929, 3,920,598, and 4,190,566, the disclosures of which are incorporated herein by reference. Exemplary hydrophilic components include monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, such as propylene oxide.

Other optional compounds also include isocyanate-reactive compounds containing self-condensing moieties. The content of these compounds are dependent upon the desired level of self-condensation necessary to provide the desired resin properties. For example, 3-amino-1-triethoxysilyl-propane will react with isocyanates through the amino group and yet self-condense through the silyl group when inverted into water. Non-condensable silanes with isocyanate reactive groups can also be used either in place of or in conjunction with the isocyanate-reactive compounds containing self-condensing moieties. U.S. Pat. Nos. 5,760,123 and 6,046,295, both incorporated in their entirety by reference herein, describe methods for use of these optional silane containing compounds.

Any process conditions for preparing the isocyanate prepolymers can be used, including those described in the patents previously incorporated by reference. In one embodiment, the final isocyanate prepolymer has a free isocyanate content ranging from about 1 to about 20%, e.g., from about 1 to about 10% by weight, based on the weight of prepolymer solids.

As mentioned above, the aqueous polyurethane dispersions are typically prepared by chain extending isocyanate prepolymers. Exemplary chain extenders include polyamine chain extenders, which can optionally be partially or wholly blocked, and include those described in U.S. Pat. Nos. 4,269,748 and 4,829,122, the disclosures of which are incorporated herein by reference, and which also describe the preparation of aqueous polyurethane dispersions by mixing isocyanate prepolymers with at least partially blocked, diamine or hydrazine chain extenders in the absence of water and then adding the mixture to water. Upon contact with water the blocking agent is released and the resulting unblocked polyamine reacts with the isocyanate prepolymer to form the polyurethane. Suitable examples of blocked amines and hydrazines include the reaction products of polyamines with ketones and aldehydes to form ketimines and aldimines, and the reaction of hydrazine with ketones and aldehydes to form ketazines, aldazines, ketone hydrazones and aldehyde hydrazones. The at least partially blocked polyamines contain at most one primary or secondary amino group and at least one blocked primary or secondary amino group which releases a free primary or secondary amino group in the presence of water. Suitable examples of polyamines for preparing the at least partially blocked polyamines have an average functionality (i.e., the number of amine nitrogens per molecule) from 2 to 6, e.g., from 2 to 4 and or from 2 to 3. The desired functionalities can be obtained by using mixtures of polyamines containing primary or secondary amino groups. The polyamines can be aromatic, aliphatic or alicyclic amines and may contain from 1 to 30, e.g., from 2 to 15, or from 2 to 10 carbon atoms. These polyamines may contain additional substituents provided that they are not as reactive with isocyanate groups as the primary or secondary amines. These same polyamines can be partially or wholly blocked polyamines. Specific examples of polyamines include 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine. Hydrazine may also be used. The chain extender may also further comprise an ionic group, e.g., an anionic group, such as a carboxylic acid group. The chain extender may be a diamine having at least one carboxylic acid group, including, for example, $H_2N-CH_2CH_2-NH-CH_2CH_2-COOH$.

In one embodiment, the amount of chain extender to be used is dependent upon the number of terminal isocyanate groups in the prepolymer. In one embodiment, the ratio of terminal isocyanate groups of the prepolymer to isocyanate-reactive groups of the chain extender ranges from about 1.0:0.6 to about 1.0:1.1, e.g., from about 1.0:0.8 to about 1.0:0.98, on an equivalent basis. Any isocyanate groups that are not chain extended with an amine will react with water, which functions as a diamine chain extender. Chain extension can take place prior to addition of water in the process, or can take place by combining the isocyanate prepolymer, chain extender, water and other optional components under agitation.

Other monomers and/or oligomers that will not participate chemically in the polyurethane synthesis steps can be added. The addition can be anywhere in the synthetic cycle as long as there is no interference in the polyurethane synthesis. One example of a compatible oligomer/monomer is a styrene allyl alcohol, abbreviated SM.

The polyurethane dispersions can be characterized by a variety of techniques known in the art. For example, thermogravimetric analyses (TGA) can b used to characterize the thermal transitions of the polyurethanes. The initial Tg is a characteristic feature of a polyurethane. In one embodiment, the at least one polyurethane has Tg of less than about −30° C. Standard thermogravimetric techniques are used to determine these glass transition temperatures. Furthermore, molecular weight is also a characteristic of the polyurethane and is routinely reported as weight average molecular weight, Mw. In one embodiment, the molecular weight, Mw, for the at least one polyurethane is at least 10,000 g/mol or at least 20,000 g/mol, e.g., at least 30,000 g/mol, such as a molecular weight, Mw, ranging from 10,000 to 150,000 g/mol or from 20,000 to 150,000 g/mol. The polyurethane binders are not limited to Gaussian distribution of molecular weight, but may have other distributions such as bimodal distributions.

In one embodiment, the at least one polyurethane is provided as dispersions in water or in the aqueous solution that the polyurethane was prepared. In one embodiment, the particle size of the polyurethane in the dispersion ranges from about 30 to about 100,000 nm, e.g., from about 30 to about 350 nm, from about 40 to about 250 nm, or from about 50 and about 200 nm.

In one embodiment, a sufficient amount of the acid groups of the polyurethane is neutralized so that, when combined with the optional hydrophilic ethylene oxide units and optional external emulsifiers, the resulting polyurethane will remain stably dispersed in the aqueous medium. Generally, at least about 75%, e.g., at least about 90%, of the acid groups are neutralized to the corresponding carboxylate salt groups. Suitable neutralizing agents for converting the acid groups to salt groups either before, during or after their incorporation into the isocyanate prepolymers, include tertiary amines, alkali metal cations and ammonia. Examples of these neutralizing agents include those described in U.S. Pat. Nos. 4,501,852 and 4,701,480, the disclosures of which are incorporated herein by reference. Exemplary neutralizing agents include trialkyl-substituted tertiary amines, such as triethyl amine, tripropyl amine, dimethylcyclohexyl amine, and dimethylethyl amine.

Neutralization may take place at any point in the process. A typical procedure includes at least some neutralization of the prepolymer, which is then chain extended in water in the presence of additional neutralizing agent. Further details about the preparation of polyurethane dispersions can be found from the previously incorporated references. As noted above, the at least one polyurethane comprises a polyurethane having ionic functionality, e.g., anionic functionality, that is prepared by using a chain extender having a carboxylic acid group. Upon neutralization, it is believed that the dispersed particles of these polyurethane dispersions would have the ionic groups on the outer surface of the particles, and are therefore self-stabilizing (i.e., do not require added surfactants and/or dispersants to remain dispersed).

In one embodiment, the final product is a stable aqueous dispersion of polyurethane particles having a solids content of up to about 60% by weight, e.g., from about 15 to about 60% by weight, or from about 30 to about 45% by weight. It is always possible to dilute the dispersions to any minimum solids content desired. Suitable polyurethane aqueous dispersions are commercially available from numerous commercial sources, for example, under the trade name Luphen®, including Luphen® D 200A, Luphen® D 259 U, and Luphen® D 207 E polyurethane dispersions, available from BASF.

The amount of polyurethane used in the inkjet ink compositions disclosed herein can be varied but is typically in an amount effective to provide the desired image quality (for example, durability) without detrimentally affecting the performance of the inkjet ink composition, e.g., the printability. In one embodiment, the at least one polyurethane is present in an amount ranging from about 0.1% to about 10.0% based on the total weight of the inkjet ink composition, e.g., from about 0.1% to about 3.0%, from about 0.5% to about 3.0%, or from about 0.5% to about 2.0% based on the total weight of the composition. Also, the relative amounts of the at least one polyurethane and the modified pigment can be varied. In one embodiment, the modified pigment and the at least one polyurethane is present in a weight ratio ranging from about 10/1 to about 1/2, e.g., from about 10/1 to about 1, from about 5/1 to about 2/1, from about 4/1 to about 2/1, or from about 3/1 to about 2/1.

In one embodiment, the inkjet ink composition comprises a modified pigment comprising a pigment having attached at least one organic group and a polyurethane dispersion. Various organic groups are described in further detail below. In one embodiment, the organic group comprises at least one geminal bisphosphonic acid group, partial esters thereof, or salts thereof. In another embodiment, the organic group comprises at least one carboxylic acid group, e.g., a benzene carboxylic acid group ($-C_6H_4-COOH$ group), a benzene dicarboxylic acid group, a benzene tricarboxylic acid group. In one embodiment, the at least one polyurethane is either: i) the reaction product of a polyester polyol, such as a polybutylene adipate, and a mixture, especially about a 1:1 mixture, of toluene diisocyanate (TDI) and hexamethylene diisocyanate (HDI), subsequently reacted with a chain extender comprising at least two amine groups and a carboxylic acid group, e.g., one having the formula $H_2N-CH_2CH_2-NH-CH_2CH_2-COOH$, or ii) the reaction product of a polyether polyol, such a polybutylene glycol, toluene diisocyanate (TDI), and a chain extender comprising at least two alcohol groups and a carboxylic acid group, e.g., one having the formula $HO-CH_2-CH(CH_3)(COOH)-CH_2-OH$. Suitable polyurethane dispersions of Type I can be prepared using the procedure described in U.S. Pat. No. 5,756,170, and suitable polyurethane dispersions of Type II can be prepared using, for example, the procedures described in U.S. Pat. No. 5,891,580, the disclosures of which are incorporated herein by reference. In one embodiment, the at least one polyurethane is of Type I.

Modified Carbon Blacks

In one embodiment, the carbon blacks are modified/treated to render them self-dispersible. For example, the carbon black can be an oxidized carbon black, e.g., having an oxygen content greater than or equal to 3%, which can be determined by methods known in the art (e.g., elemental analysis).

Generally, oxidized blacks feature a surface having ionic or ionizable, oxygen-containing groups such as one or more of phenols, lactones, carbonyls, carboxyls (e.g., carboxylic acids), anhydrides, ethers, and quinones. The extent of oxidation of carbon black can determine the surface concentration of such ionic or ionizable groups. The carbon blacks disclosed herein can be oxidized by a variety of oxidizing agents known in the art. Exemplary oxidizing agents for carbon blacks include oxygen gas, ozone, $NO_2$ (including mixtures of $NO_2$ and air), peroxides such as hydrogen peroxide, persulfates such as sodium, potassium, and ammonium persulfate, hypohalites such as sodium hypochlorite, halites, halates, or perhalates (such as sodium chlorite, sodium chlorate, or sodium perchlorate), oxidizing acids such as nitric acid, and transition metal-containing oxidants such as permanganate salts, osmium tetroxide, chromium oxides, ceric ammonium nitrates, and mixtures thereof, e.g., mixtures of gaseous oxidants such as oxygen and ozone. In one embodiment, the carbon blacks disclosed herein are oxidized via ozone oxidation.

In one embodiment, the carbon black is a modified carbon black having at least one attached organic group. In one embodiment, an "attached" organic group can be distinguished from an adsorbed group in that a soxhlet extraction for several hours (e.g., at least 4, 6, 8, 12, or 24 hours) will not remove the attached group from the pigment (e.g., carbon black). In another embodiment, the organic group is attached to the pigment (e.g., carbon black) if the organic group cannot be removed after repeated washing (e.g., 2, 3, 4, 5, or more washings) with a solvent or solvent mixture that can dissolve the starting organic treating material but cannot disperse the treated pigment. In yet another embodiment, "attached" refers to a bond such as a covalent bond, e.g., a pigment (e.g., carbon black) bonded or covalently bonded to the organic group.

The organic group may be an aliphatic group, a cyclic organic group, or an organic compound having an aliphatic portion and a cyclic portion. In one embodiment, the organic group is attached via a diazonium salt derived from a primary amine capable of forming, even transiently, a diazonium salt. Other methods of attachment are described below. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

In one embodiment, the at least one attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —COO$^-$, —SO$_3^-$, —OSO$_3^-$, —HPO$_3^-$; —OPO$_3^{2-}$, or —PO$_3^{2-}$, and specific examples of an anionizable group can include —COOH, —SO$_3$H, —PO$_3$H$_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —NR'$_2$H$^+$, where R' represent an organic group, such as a substituted or unsubstituted aryl or alkyl groups. Organic ionic groups include those described in U.S. Pat. No. 5,698,016, the disclosure of which is incorporated herein by reference.

For example, the attached group may be an organic group such as a benzene carboxylic acid group (—C$_6$H$_4$—COOH group), a benzene dicarboxylic acid group, a benzene tricarboxylic acid group, a benzene sulfonic acid group (a —C$_6$H$_4$—SO$_3$H group), or salts thereof. In one embodiment, surface modification to introduce ionic or ionizable groups onto a pigment surface, such as chlorination and sulfonylation, may also be used.

In one embodiment, the organic group can be attached either directly (bonding to a native atom of the carbon black) or indirectly via an intermediary or spacer group. In one embodiment, the intermediary or spacer group is selected from substituted and unsubstituted C$_1$-C$_{12}$ alkyl, C$_5$-C$_{20}$ aryl, C$_6$-C$_{24}$ alkyaryl and aralkyl, wherein "alkyl" can be optionally interrupted by a group containing a heteroatom selected from N, O, and S, and "aryl" includes ring carbon atoms optionally replaced by a group containing a heteroatom selected from N, O, and S. Typically, the attached group resides at the pigment surface.

The organic group can be substituted or unsubstituted. In one embodiment, the organic group is substituted with at least one functional group selected from esters, amides, ethers, carboxyls, aryls, alkyls, halides, sulfonates, sulfates, phosphonates, phosphates, carboxy later. OR", COR", CO$_2$R", OCOR", CN, NR"$_2$, SO$_2$, CO, SO$_3$, SO$_3$H, OSO$_2$, OSO$_3$, SO$_3$NR", R"NSO$_2$, NR"(COR"), NR"CO, CONR"$_2$, NO$_2$, NO$_3$, CONR", NR"CO$_2$, O$_2$CNR", NR"CONR", S, NR", SO$_2$C$_2$H$_4$, arylene as defined above, alkylene as defined above, wherein R", which can be the same or different, represents an organic group such as hydrogen, aryl, and alkyl, as defined herein.

Further examples of representative organic groups are described in U.S. Pat. Nos. 5,571,311; 5,630,868; 5,707,432, 5,955,232; 5,922,118; 5,900,029; 5,895,522; 5,885,335; 5,851,280; 5,837,045; 5,713,988; and 5,803,959; PCT Publication No. WO 96/18688; and PCT Publication No. WO 96/18690, the disclosures of which are incorporated herein by reference.

In one embodiment, the organic group contains a 5-membered heteroaromatic group comprising at least two ring heteroatoms, such as those disclosed in PCT Pub. No. WO 2011/143533, the disclosure of which is incorporated herein by reference. In one embodiment, the For example, the organic group can have formula (Ib) or (IIb):

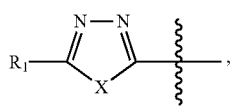

(Ib)

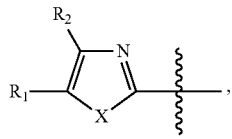

(IIb)

For Ib, X can be O, N(R$_a$), or S; and R$_1$ can be H, C$_1$-C$_{10}$ alkyl, C$_2$-C$_{10}$ alkenyl, C$_2$-C$_{10}$ alkynyl, C$_3$-C$_{20}$ cycloalkyl, C$_3$-C$_{20}$ cycloalkenyl, C$_1$-C$_{20}$ heterocycloalkyl, C$_1$-C$_{20}$ heterocycloalkenyl, aryl, heteroaryl, halo, cyano, OR$_b$, COOR$_b$, OC(O)R$_b$, C(O)R$_b$, C(O)NR$_b$R$_c$, SO$_3$R$_c$, NR$_b$R$_c$, or N$^+$(R$_b$R$_c$R$_d$)Y, in which each of R$_a$, R$_b$, R$_c$, and R$_d$, independently, can be H, C$_1$-C$_{10}$ alkyl, C$_3$-C$_{20}$ cycloalkyl, C$_1$-C$_{20}$ heterocycloalkyl, aryl, or heteroaryl and Y can be an anion. In general, Y can be any suitable anion, such as chloride, bromide, iodide, sulfate, nitrate, phosphate, citrate, methanesulfonate, trifluoroacetate, acetate, malate, tosylate, tartrate, fumurate, glutamate, glucuronate, lactate, glutarate, or maleate. For IIb, X is O, N(R$_a$), or S; and each of R$_1$ and R$_2$, independently, is H, C$_1$-C$_{10}$ alkyl, C$_2$-C$_{10}$ alkenyl, C$_2$-C$_{10}$ alkynyl, C$_3$-C$_{20}$ cycloalkyl, C$_3$-C$_{20}$ cycloalkenyl, C$_1$-C$_{20}$ heterocycloalkyl, C$_1$-C$_{20}$ heterocycloalkenyl, aryl, heteroaryl, halo, cyano, OR$_b$, COOR$_b$, OC(O)R$_b$, C(O)R$_b$, C(O)NR$_b$R$_c$, SO$_3$R$_c$, NR$_b$R$_c$, or N$^+$(R$_b$R$_c$R$_d$)Y, each of R$_a$, R$_b$, R$_c$, and R$_d$, independently, being H, C$_1$-C$_{10}$ alkyl, C$_3$-C$_{20}$ cycloalkyl, C$_1$-C$_{20}$ heterocycloalkyl, aryl, or heteroaryl and Y being an anion; provided that at least one of R$_1$ and R$_2$ is not H.

In one embodiment, the at least one organic group comprises at least one group selected from carboxylic acids, sulfonic acids, phosphonic acids (e.g., bisphosphonic acids), hydroxyls, amines, and esters, amides, and salts thereof.

In one embodiment, the at least one organic group comprises the formula —[R(A)]-, wherein:
  R is attached to the carbon black and is selected from arylene, heteroarylene, and alkylene, and
  A is selected from carboxylic acids, sulfonic acids, phosphonic acids, hydroxyls, amines, and esters, amides, and salts thereof.

In another embodiment, the at least one organic group comprises the formula —[R(A)]-, wherein:
  R is attached to the carbon black and is selected from arylene, heteroarylene, and alkylene, and
  A is selected from hydrogen, alkyls, aryls, heteroaryls, alkylene oxides (e.g., ethylene or propylene oxide), carboxylic acid esters, and glycols.

In another embodiment, the at least one organic group comprises the formula —[R(A)]-, wherein:
  R is attached to the carbon black and is selected from arylene, heteroarylene, and alkylene, and
  A is selected from polymers.

The arylene, heteroarylene, and alkylene can be unsubstituted or substituted, e.g., with one or more of the functional groups listed above. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a C$_5$-C$_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Exemplary arylenes include phenyl, naphthyl, anthracenyl, phenanthrenyl, biphenyl, and exemplary heteroarylenes include pyridinyl, imidazolyl, pyrazolyl, thienyl, thiazolyl, furyl, triazinyl, indolyl, benzothiadiazolyl, and benzothiazolyl. Alkylenes may be branched or unbranched. The alkylene may be a $C_1$-$C_{12}$ alkylene such as methylene, ethylene, propylene, or butylene, optionally interrupted by a heteroatom.

In one embodiment, R is a substituted R and comprises an arylene, heteroarylene, and alkylene substituted with at least a spacer group that is bonded to A. In one embodiment, a substituted R comprises R'-Sp, wherein R' is selected from arylene, heteroarylene, and alkylene, as defined above, and Sp is a spacer selected from the functional groups listed above capable of bonding to both R' and A. In another embodiment, Sp is selected from —$CO_2$—, —$O_2C$—, —CO—, —$OSO_2$—, —$SO_3$—, —$SO_2$—, —$SO_2C_2H_4$—O—, —$SO_2C_2H_4S$—, —$SO_2C_2H_4NR''$—, —O—, —S—, —NR''—, —NR''CO—, —CONR''—, —NR''$CO_2$—, —$O_2CNR''$—, —NR''CONR''—, —N(COR'')CO—, —CON(COR'')—, —NR''COCH($CH_2CO_2R''$)— and cyclic imides therefrom, —NR''$COCH_2CH(CO_2R'')$— and cyclic imides therefrom, —CH($CH_2CO_2R''$)CONR''—, and cyclic imides therefrom, —CH($CO_2R''$)$CH_2$CONR'' and cyclic imides therefrom, (including phthalimide and maleimides of these), sulfonamide groups (including —$SO_2$NR''— and —NR''$SO_2$—groups), arylene groups, alkylene groups. R'', which can be the same or different, is defined as above, or represents hydrogen or an organic group such as a substituted or unsubstituted aryl or alkyl group, e.g., $C_5$-$C_{20}$ aryl groups, and substituted and unsubstituted $C_1$-$C_6$ alkyl groups. In one embodiment, Sp is selected from —$CO_2$—, —$O_2C$—, —O—, —NR''—, —NR''CO—, —CONR''—, —$SO_2$NR''—, —$SO_2CH_2CH_2$NR''—, —$SO_2CH_2CH_2$O—, or —$SO_2CH_2CH_2$S— wherein R'' is defined as above, e.g., selected from H and $C_1$-$C_6$ alkyl groups.

In another embodiment, Sp is derived from a compound having a reactive group selected from a carboxylic acid or ester, an acid chloride, a sulfonyl chloride, an acyl azide, an isocyanate, a ketone, an aldehyde, an anhydride, an amide, an imide, an imine, an α,β-unsaturated ketone, aldehyde, or sulfone, an alkyl halide, an epoxide, an alkyl sulfonate or sulfate such as a (2-sulfatoethyl)-sulfone group, an amine, a hydrazine, an alcohol, a thiol, a hydrazide, an oxime, a triazene, a carbanion, an aromatic compound, salts or derivatives thereof, or any combination thereof. Examples of such compounds include amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)-sulphone, (APSES), p-aminobenzoic acid (PABA), 4-aminophthalic acid (4-APA), and 5-aminobenzene-1,2,3-tricarboxylic acid.

In one embodiment, the at least one organic group is capable of binding calcium (e.g., having defined calcium index values), including those organic groups described in PCT Pub. No. WO 2007/053564, the disclosure of which is incorporated herein by reference. For example, the organic group comprises at least one geminal bisphosphonic acid group, partial esters thereof, or salts thereof, e.g., a group having the formula —CQ($PO_3H_2$)$_2$, partial esters thereof, or salts thereof, wherein Q is bonded to the geminal position and may be H, R, OR, SR, or $NR_2$ wherein R'', which can be the same or different, is defined as above, or can be H, a $C_1$-$C_{18}$ saturated or unsaturated, branched or unbranched alkyl group, a $C_1$-$C_8$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

Other organic groups capable of binding calcium include: at least one hydroxamic acid group or salt thereof (e.g., at least one group having the formula —N(OH)—CO— or a salt thereof); at least one heteroaryl group having at least one OH group or salt thereof (e.g., a nitrogen-containing heteroaryl group, such as a pyridinyl group or a quinolinyl group, and the organic group is a hydroxy pyridinyl group or a hydroxy quinolinyl group, in which the hydroxy group is at a position on the heteroaryl group such that it is geometrically close to the heteroatom, such as ortho to the heteroatom; or a heteroaryl having two OH groups in positions ortho to each other); at least one phosphonic acid group or salt thereof and at least one second ionic, ionizable or basic group (a basic group is a Lewis base, such as an OH group or an amino group that can be geminal to the phosphonic acid group); at least one heteroaryl group having at least one carboxylic acid group or salt thereof (e.g., at least two or three carboxylic acid groups, such as at least two carboxylic acid groups that are ortho or meta to each other); an aryl group having at least one nitroso group and at least one OH group (e.g., ortho to each other), or a salt thereof; an azoarene group having at least two OH groups, at least two $NH_2$ groups, or at least one OH group and at least one $NH_2$ group (e.g., at least two OH groups, at least two $NH_2$ groups, or at least one OH group and at least one $NH_2$ group) and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group (e.g., the OH and/or $NH_2$ groups are located at positions ortho to the azo group). Other groups are disclosed in WO 2007/053564.

In one embodiment, the attached organic group comprises a polymer. In one embodiment, the polymer comprises at least one non-ionic group. Examples include alkylene oxide groups of from about 1 to about 12 carbons and polyols, such as a —$CH_2$—$CH_2$—O— group, a —CH($CH_3$)—$CH_2$—O— group, a —$CH_2$—CH($CH_3$)—O— group, a —$CH_2CH_2CH_2$—O— group, or combinations thereof. These non-ionic groups may further comprise at least one ionic or ionizable group as disclosed herein.

The attached polymers, which can be homopolymers or copolymers, can also be derived from monomers selected from acrylic and methacrylic acid, acrylate esters, methacrylate esters, acrylamides and methacrylamides, acrylonitriles, cyanoacrylate esters, maleate and fumarate diesters, vinyl pyridines, vinyl N-alkylpyrroles, vinyl acetate, vinyl oxazoles, vinyl thiazoles, vinyl pyrimidines, vinyl imidazoles, vinyl ketones, vinyl ethers, and styrenes. Vinyl ethers include those that can be prepared by cationic polymerization, such as those having the general structure $CH_2$=CH (OR), wherein R is an alkyl, aralkyl, alkaryl, or aryl group or is a group comprising one or more alkylene oxide groups. Vinyl ketones include those in which the β-carbon atom of the alkyl group does not bear a hydrogen atom, such as vinyl ketones in which both β-carbons bear a $C_1$-$C_4$ alkyl group, halogen, etc. or a vinyl phenyl ketone in which the phenyl group may be substituted with from 1 to 5 $C_1$-$C_6$ alkyl groups and/or halogen atoms. Styrenes include those in which the vinyl group is substituted with a $C_1$-$C_6$ alkyl group, such as at the α-carbon atom, and/or those in which the phenyl group is substituted with from 1 to 5 substituents including a $C_1$-$C_6$ alkyl, alkenyl (including vinyl), or alkynyl (including acetylenyl) group, a phenyl group, a haloalkyl group, and functional groups such as $C_1$-$C_6$ alkoxy, halogen, nitro, carboxy, sulfonate, $C_1$-$C_6$ alkoxycarbonyl, hydroxy (including those protected with a $C_1$-$C_6$ acyl group), and cyano groups. Specific examples include methyl acrylate (MA), methyl methacrylate (MMA), ethyl acrylate (EA), ethyl methacrylate (EMA), butyl acrylate (BA), 2-ethylhexyl acrylate (EHA), acrylonitrile (AN), methacrylonitrile, styrene, and derivatives thereof.

The polymer can be prepared by the cationic or anionic polymerization of one or more polymerizable monomers. For example, polyvinyl ethers can be prepared by cationic polymerization of monomers, such as those having the general structure $CH_2$=$CH(OR)$, wherein R is an alkyl, aralkyl, alkaryl, or aryl group or is a group comprising one or more alkylene oxide groups. Other cationically or anionically polymerizable monomers can also be included.

The polymer can also be prepared by polycondensation techniques. For example, the polymer may be a polyester or a polyurethane having a functional group described above. For polyurethanes, examples of suitable methods include a solution method which comprises preparing an isocyanate-terminated prepolymer in a low boiling solvent (such as acetone) unreactive with an isocyanate group, introducing a hydrophilic group such as diamine or polyol therein, effecting phase change by diluting with water, and distilling off a solvent to obtain a polyurethane dispersion. Another suitable method comprises preparing an isocyanate group-terminated prepolymer having a hydrophilic group introduced, dispersing in water, and extending a chain with an amine.

Polyurethanes may be prepared by the prepolymer method, and a polyhydroxy compound having a low molecular weight may be used at that time. Examples of the polyhydroxy compound having a low molecular weight include polyester diols such as glycol and alkylene oxide, a trihydric alcohol such as glycerin, trimethylolethane and trimethylolpropane.

In one embodiment, the polymer has a low acid number. In one embodiment, the polymer may be an acidic group containing polymer having an acid number of less than or equal to about 200, such as less than or equal to about 150, less than or equal to about 110, or less than or equal to about 100. In another embodiment, the acid number of the polymer is greater than or equal to about 30. Thus, the polymer may be an acidic group containing polymer having an acid number of from about 30 to about 200, such as from about 30 to about 110, from about 110 to about 150, or from about 150 to about 200.

In one embodiment, the carbon black is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,534,569; 6,398,858 and 6,494,943 (high shear conditions) 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In yet another embodiment, the at least one carbon black can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos. 6,664,312, 6,831,194 (reaction with anhydride component), 6,936,097, U.S. Pub. Nos. 2001/0036994, 2003/0101901 (reaction with organic groups having —N=N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference.

In one embodiment, the carbon black is attached to the organic group via an —O—C— bond, wherein the —O—C— bond forms one or more of phenolate, naphtholate, ester, and ether linkages wherein the carbon atom of the —O—C— bond, and substituents thereof, are not native to the carbon black prior to modification. In one embodiment, and carbon black is attached to the organic group via phenolate or naphtholate linkages in which the aromatic groups of the phenolate or naptholate are native to the carbon black. In one embodiment, these linkages can be achieved via a Mitsunobu reaction, as disclosed in PCT App. No. PCT/US2013/39381, in which a first reactant comprising a protonated nucleophile having a pKa <15 is reacted with a second reactant comprising a hydroxyl-containing organic group. The carbon black can be attached to either the first or second reactant.

Other methods to prepare modified pigments, including those having attached polymeric groups, have also been described in, for example, PCT Publication No. WO 01/51566, which discloses methods of making a modified pigment by reacting a first chemical group and a second chemical group to form a pigment having attached a third chemical group. PCT Pub. No. WO 2007/053563 discloses modified colorants having attached at least one polymeric group comprising a polymer having at least one functional group having defined calcium index values. Specific embodiments of the organic groups are described, including organic groups comprising at least one geminal bisphosphonic acid group, partial esters thereof, or salts thereof.

Other methods for the preparation of polymer modified pigment products have also been developed. For example, U.S. Pat. Nos. 7,056,962, 6,478,863, 6,432,194, 6,336,965, U.S. Pub. No. 2006/0189717, and PCT Pub. No. WO 2008/091653 the disclosures of which are incorporated herein by reference, describe methods for attaching polymers to pigments through the use of a diazonium salt. U.S. Pat. Nos. 7,173,078, 6,916,367, 6,911,073, 6,723,783, 6,699,319, 6,472,471, and 6,110,994, the disclosures of which are incorporated herein by reference, disclose methods of preparing a polymer modified pigment by reacting polymer and a pigment having an attached reactive group. Modified pigments having attached polymeric groups have also been disclosed in U.S. Pub. No. 2008/0177003, the disclosure of which is incorporated herein by reference, utilizes a polymer in the form of a melt.

The polymer modified pigments may also be prepared by polymerization of monomers from a pigment. For example, the polymer modified pigments may be prepared by radical polymerization, controlled polymerization methods, such as atom transfer radical polymerization (ATRP), stable free radical (SFR) polymerization, and reversible addition-fragmentation chain transfer polymerization (RAFT), ionic polymerizations (anionic or cationic) such as group transfer polymerization (GTP), and condensation polymerization. Also, the polymer modified pigments may be prepared using the methods described in, for example, U.S. Pat. Nos. 6,372,820; 6,350,519; 6,551,393; or 6,368,239 or in PCT Pub. Nos. 2006/086599 and 2006/086660, the disclosures of which are incorporated herein by reference. For modified pigments comprising the pigment coated by the polymer, these modified pigments can be prepared using any method known in the art, such as those described in U.S. Pat. Nos. 5,085,698, 5,998,501, 6,074,467, 6,852,777, and 7,074,843, and International Patent Publication Nos. WO 2004/111, 140, WO 2005/061087, and WO 2006/064193, the disclosures of which are incorporated herein by reference.

The surface grafting carbon black with polymers and prepolymers is described in N. Tsubokawa, in Prog. Polym. Sci., 17, 417, 1992, and J. Polym. Sci. Polym. Chem. Ed. Vol. 20, 1943-1946 (1982), the disclosures of which are incorporated herein by reference. Polymers having terminal hydroxyl or amino groups can be grafted onto surface carboxyl groups of the carbon black, as disclosed in N. Tsubokawa in Reactive & Functional Polymers 27 (1995) 75-81.

The modified pigments having attached at least one polymeric group may further comprise a second organic group, which is different from the polymeric groups described above. These include, for example, the groups described in U.S. Pat. No. 5,630,868, the disclosure of which is incorporated herein by reference. For example, the modified pigment may further comprise a second attached organic group that may comprise at least one ionic group, at least one ionizable group, or a mixture thereof. In one embodiment, the ionic or ionizable group is an anionic or anionizable group. Any of the ionic or ionizable groups, e.g., the anionic or anionizable groups, described above regarding the pigment of the modified pigment of the present invention may be the second organic group. Furthermore, the second organic group may be a polymeric group comprising a polymer. Any of the polymeric groups described above can also be used as the second attached organic group.

The amount of attached organic groups can be varied, depending on the desired use of the modified carbon black and the type of attached group. For example, the total amount of organic group may be from about 0.01 to about 10.0 micromoles of groups/m² surface area of pigment, as measured by nitrogen adsorption (BET method), including from about 0.5 to about 5.0 micromoles/m², from about 1 to about 3 micromoles/m², or from about 2 to about 2.5 micromoles/m². Additional attached organic groups, which differ from those described for the various embodiments of the present invention, may also be present.

Dispersions and Inkjet Ink Additives

The inkjet ink composition can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, pH control agents, drying accelerators, penetrants, and the like. The amount of additive will vary depending on a variety of factors but are generally present in an amount ranging from 0% and 40%, e.g., from 0.1% to 40%, based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts. Additional details on dispersions and the inkjet ink compositions are provided below.

In one embodiment, the inkjet ink composition further comprises a liquid vehicle, e.g., an aqueous or non-aqueous vehicle. In one embodiment, the liquid vehicle is an aqueous liquid vehicle, e.g., the vehicle contains water such as an aqueous solution. In one embodiment, the aqueous solution contains water alone or mixtures of water with water miscible solvents such as alcohols or any water miscible solvent, co-solvent, and/or humectant described herein. In one embodiment, the inkjet ink composition contains greater than 40% by weight or greater than 50% by weight water.

Humectants and water soluble organic compounds may also be added to the inkjet ink composition of the present invention, e.g., for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like;

hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

In one embodiment, the inkjet ink composition comprises a cosolvent. In one embodiment, the cosolvent is soluble or miscible in water at concentrations of at least 10% by weight and is also chemically stable to aqueous hydrolysis conditions (e.g., reaction with water under heat aging conditions, including, for example, the hydrolysis of esters and lactones). In one embodiment, the cosolvent has a dielectric constant below that of water, such as a dielectric constant ranging from about 10 to about 78 at 20° C. Examples of suitable cosolvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). These cosolvents may be used alone or in combination.

The amount of the cosolvent can be varied depending on a variety of factors, including the properties of the cosolvent (solubility and/or dielectric constant), the type of modified pigment, and the desired performance of the resulting inkjet ink composition. The optional cosolvent may be used in amounts of less than or equal to about 40% by weight based on the total weight of the inkjet ink composition, including less than or equal to about 30% and less than or equal to about 20%. Also, when used, the amount of the optional cosolvent is greater than or equal to about 2% by weight based on the total weight of the inkjet ink composition, including greater than or equal to about 5% and greater than or equal to about 10% by weight.

Additives for controlling or regulating the pH of the inkjet ink composition (pH control agents) may also be used. Examples of suitable pH regulators include various amines such as diethanolamine and triethanolamine as well as various hydroxide reagents. An hydroxide reagent is any reagent that comprises an OH— ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH— ions in an aqueous medium. Examples include carbonates such as sodium carbonate, bicarbonates such as sodium bicarbonate, and alkoxides such as sodium methoxide and sodium ethoxide. Buffers may also be added.

In one embodiment, the inkjet ink composition comprises the at least one polyurethane in an amount ranging from 0.1 to 1% by weight, the disclosed carbon black in an amount ranging from 2-3% by weight, in which the composition has a pH ranging from 9 to 10. The carbon black may be modified with a benzene carboxylic acid group (—$C_6H_4$— COOH group), a benzene dicarboxylic acid group, a benzene tricarboxylic acid group, a benzene sulfonic acid group (a —$C_6H_4$—$SO_3H$ group), or salts thereof. Surfactants can be selected from Silwet® L-7602 surfactant, an ethelenate-oxide siloxane (Momentive Performance Materials), and Aerosol® IB-45/Aerosol® TR-70 surfactants (sulfosuccinates available from Cytec Industries). Dispersants can be selected from Joncryl® 683 styrenated acrylic (BASF), SMA® 1440 styrene maleic anhydride copolymer (Cray Valley), and Pluronic® F38 ethylene oxide/propylene oxide block copolymer (BASF). The composition can comprise at least one cosolvent selected from trimethylolpropane and/or other cosolvents disclosed herein. The polyurethane can be selected from a poly(propylene glycol)-based, anionically self-stabilizing polyurethane, having an acid number in the range of 24-60 mg KOH/g polyurethane and a molecular weight (Mw) ranging from 20,000 to 150,000 g/mole, e.g., Luphen® polyurethanes (BASF).

EXAMPLES

Polymer Additive Comparisons: Examples 1-4 and Comparative Examples 1-3

The effect of various polymer additive types on optical density (OD) were examined in Examples 1-4. Various inks were prepared according to the formula of Table 1, which lists the components as weight percent.

TABLE 1

| Solvent (2-pyrrolidone) | 18 |
| Surfactant (S7602) | 0.05 |
| Durability additive (L259) | 0.30 |
| Carbon Black 1 (self-dispersed) | 2.50 |
| Polymer additive | 0.50 |
| Water | balance |

The surfactant S7602 is Silwet® L-7602 surfactant, an ethelenateoxide siloxane commercially available from (Momentive Performance Materials). The durability additive L259 is Luphen® D 259 U polyurethane aqueous dispersion, available from BASF. Carbon Black 1 was derived from a base carbon black prepared according to U.S. Pat. No. 9,388,300 (Example G), the disclosure of which is incorporated herein by reference, having an OAN of 179 mL/100 g and an STSA of 194 m$^2$/g. The base carbon black was then functionalized with 5-aminobenzene-1,2,3-tricarboxylic acid to form the self-dispersed Carbon Black 1 as described in U.S. Pat. No. 7,972,428, the disclosure of which is incorporated herein by reference.

The polymer additives for Examples 1-4 were, respectively: J819=Joncryl® 819 styrene acrylic resin (BASF); JE684=Joncryl® ECO 684 styrene acrylic resin (BASF); SMA-EF40=SMA® EF-40 flake, a styrene maleic anhydride copolymer (Cray Valley); and PF38=Pluronic® F38 block copolymer (polyoxyethylene/polyoxypropylene) (BASF). The inks of Examples 1-4 were compared against a control sample containing no polymer additive, and three comparative examples: polyacrylic acid neutralized by NaOH (Aldrich); polyvinylpyrrolidone, 10,000 molecular weight (Scientific Polymer Products); and Z3700=Zetasperse® pigment dispersing additive (Air Products).

Drawdowns of inks (75 μL) were obtained with a #16 wire-wound lab rod on both Staples copy paper and Xerox 4200 paper. The optical density (OD) was analyzed by using an X-rite 530 spectrophotometer with the following settings: Illumination at D65, 2 degree Standard Observer, DIN density standard, white base set to Abs, and no filter. For each paper, the OD value of Table 2 was reported as an average of at least 5 measurements taken at different spots of the drawdown images.

TABLE 2

| | Polymer additive | OD (Staples) | OD (Xerox 4200) |
|---|---|---|---|
| Control | no polymer additive | 1.37 | 1.15 |
| Example 1 | J819 | 1.48 | 1.18 |
| Example 2 | JECO684 | 1.45 | 1.23 |
| Example 3 | SMA-EF40 | 1.48 | 1.12 |
| Example 4 | PF38 | 1.38 | 1.12 |
| Comparative Example 1 | polyacrylic acid neutralized by NaOH | 1.05 | 0.94 |
| Comparative Example 2 | polyvinylpyrrolidone | 1.19 | 0.97 |
| Comparative Example 3 | Z3700 | 1.15 | 0.98 |

An OD performance that is 0.05 unit lower than that of the control was considered undesirable. Better or equal performance can be seen for the inks of Examples 1-4 compared to those of Comparative Examples 1-3. From Table 2, it can be seen that the inks containing the claimed polymer additive types were more effective for improving OD than others. Without wishing to be bound by any theory, certain polymer additives (such as those of Comparative Examples 1-3) may add too much stability to the pigment, which can lead to decreased OD performance.

Carbon Black Comparisons: Example 5 and Comparative Examples 4-6

In the following examples, inks containing carbon blacks of different OAN and STSA values are compared. Drawdowns were performed and OD values were obtained as described for Examples 1-4. Table 3 lists the ink formulations and relative amounts of the ink components (wt. %) as well as the resulting OD values. For all inks, the solvent was 2-pyrrolidone, the surfactant was Silwet® L-7602 surfactant (Momentive Performance Materials), the dispersant was SMA® EF-40 flake (Cray Valley), and the durability additive was Luphen® D 259 U polyurethane aqueous dispersion (BASF).

Carbon Black 1 is as described in Examples 1-4. Carbon Black 2 is a self-dispersed carbon black functionalized with 5-aminobenzene-1,2,3-tricarboxylic acid in the same manner as Carbon Black 1. Carbon Black 3 is a self-dispersed pigment functionalized with 4-aminobenzoic acid. Carbon Black 4 is a self-dispersed carbon black functionalized with bisphosphonate groups and can be prepared as described in U.S. Pat. No. 8,858,695, the disclosure of which is incorporated herein by reference.

TABLE 3

| | OAN (mL/100 g) | STSA (m$^2$/g) | Example 5 | Comparative Example 4 | Comparative Example 5 | Comparative Example 6 |
|---|---|---|---|---|---|---|
| solvent | | | 18 | 18 | 18 | 18 |
| surfactant | | | 0.05 | 0.05 | 0.05 | 0.05 |
| dispersant | | | 0.50 | 0.50 | 0.50 | 0.50 |
| durability additive | | | 0.3 | 0.3 | 0.3 | 0.3 |

TABLE 3-continued

| | OAN (mL/100 g) | STSA (m²/g) | Example 5 | Comparative Example 4 | Comparative Example 5 | Comparative Example 6 |
|---|---|---|---|---|---|---|
| Carbon Black 1 | 179 | 194 | 2.50 | | | |
| Carbon Black 2 | 118 | 165 | | 2.50 | | |
| Carbon Black 3 | 118 | 165 | | | 2.50 | |
| Carbon Black 4 | 64 | 251 | | | | 2.50 |
| water | | | balance | balance | balance | balance |
| OD (Staples) | | | 1.50 | 1.37 | 1.29 | 1.31 |
| OD (Xerox) | | | 1.19 | 1.10 | 0.98 | 1.11 |

Table 3 shows that the ink containing carbon black that satisfies the parameters OAN≥170 mL/100 g and STSA ranging from 160 to 220 m²/g (i.e., Carbon Black 1) provides the best OD performance values compared to inks containing that fall outside these parameters.

Surfactant Comparisons: Examples 5-6 and Comparative Examples 7-12

These examples demonstrate the effect of surfactant on OD values. Table 4 below lists ink formulations containing different surfactant types in which the relative amounts of the ink components are provided as weight %. For all inks, the solvent was 2-pyrrolidone, the dispersant was SMA® EF-40 flake (Cray Valley), the durability additive was Luphen® D 259 U polyurethane aqueous dispersion (BASF), and the pigment was Carbon Black 1 as described in Examples 1-5.

From Table 4, it can be seen that inks containing the ethoxylated siloxane (Example 5) and sulfosuccinate-based surfactant (Example 6) produced the best OD values when compared to the other types of surfactants as shown in the Comparative Examples 7-12.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated

TABLE 4

| | Ex 5 | Ex 6 | CompEx 7 | CompEx 8 | CompEx 9 | CompEx 10 | CompEx 11 | CompEx 12 |
|---|---|---|---|---|---|---|---|---|
| S7602 | 0.05 | | | | | | | |
| A IB45/TR70 | | 0.18/0.006 | | | | | | |
| S465 | | | 0.2 | | | | | |
| S440 | | | | 0.2 | | | | |
| n-octyl-2-pyrr. | | | | | 0.5 | | | |
| T 15-S-5 | | | | | | 0.4 | | |
| T 15-S-7 | | | | | | | 0.4 | |
| D607 | | | | | | | | 0.2 |
| solvent | 18 | 18 | 18 | 18 | 18 | 18 | 18 | 18 |
| polymer add. | 0.50 | 0.50 | 0.50 | 0.50 | 0.50 | 0.50 | 0.50 | 0.50 |
| durability add. | 0.3 | 0.3 | 0.3 | 0.3 | 0.3 | 0.3 | 0.3 | 0.3 |
| Carbon Black 1 | 2.50 | 2.50 | 2.50 | 2.50 | 2.50 | 2.50 | 2.50 | 2.50 |
| Water | balance | balance | balance | balance | balance | balance | balance | balance |
| OD (Staples) | 1.50 | 1.45 | 1.18 | 1.00 | 0.98 | 0.99 | 0.99 | 1.00 |
| OD (Xerox) | 1.19 | 1.20 | 1.03 | 0.96 | 0.95 | 0.95 | 0.95 | 0.97 |

The ink of Example 5 is described above in the carbon black comparisons. For the remainder of the inks, the various surfactants are as follows: A IB45/TR70=Aerosol® IB-45 and TR70 surfactants, which are both sulfosuccinate-based surfactants (Cytec); S465 and S440=Surfynol® 465 and 440 surfactants, which are ethoxylated acetylenic diols (Air Products); -octyl-2-pyrr.=n-octyl-2-pyrrolidone; T 15-S-5 and T 15-S-7=Tergitol™ 15-S-5 and 15-S-7 surfactants, which are secondary alcohol ethoxylates (Dow); and D607=Dynol® 607 surfactant, which is an ethoxylated acetylenic diol (Air Products) The surfactants were added in amounts to target a surface tension range of 32-39 dyne/cm measured by a Kruss Digital Tensiometer K-11 using a Du Nouy Platinum Ring. The actual amounts added reflect the differing efficiencies of the surfactants at lowering the surface tension of the aqueous inks.

An OD of greater than 1.3 and 1.10 were considered acceptable on the Staples and Xerox papers, respectively.

herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:
1. An inkjet ink composition comprising:
   (a) a carbon black having the following properties:
       OAN≥170 mL/100 g; and
       STSA ranging from 160 to 220 m²/g,
       wherein the carbon black is modified with at least one attached organic group;
   (b) at least one polymeric dispersant selected from polyoxyethylene/polyoxypropylene block copolymers, sty- rene-acrylic resins, styrene-methacrylic resins, styrene-maleic acid copolymers, and styrene-maleic anhydride copolymers;
(c) at least one surfactant selected from ethoxylated siloxanes, succinic acid esters, and succinic acid salts; and
(d) at least one polyurethane.

2. The composition of claim 1, wherein a ratio of STSA/BET surface area of the carbon black ranges from 0.7 to 1.

3. The composition of claim 1, wherein the carbon black has a BET surface area ranging from 190 to 275 $m^2/g$.

4. The composition of claim 1, wherein the carbon black has a COAN of at least 120 mL/100 g.

5. The composition of claim 1, wherein the carbon black has a COAN of at least 130 mL/100 g.

6. The composition of claim 1, wherein the carbon black has a ratio of OAN/COAN ranging from 1.30 to 1.50.

7. The composition of claim 1, wherein the carbon black is a furnace black.

8. The composition of claim 1, wherein the at least one polymeric dispersant is selected from styrene-methacrylic resins.

9. The composition of claim 8, wherein the styrene-methacrylic resins are selected from styrene-(meth)acrylic acid copolymers, styrene-(meth)acrylic acid-(meth)acrylate ester copolymers, styrene-α-methylstyrene-(meth)acrylic acid copolymers, and styrene-α-methylstyrene-(meth)acrylic acid-(meth)acrylate ester copolymers, and salts thereof.

10. The composition of claim 1, wherein the at least one polymeric dispersant is selected from styrene-maleic acid copolymers, and styrene-maleic anhydride copolymers.

11. The composition of claim 1, wherein the at least one polymeric dispersant is selected from polyoxyethylene/polyoxypropylene block copolymers.

12. The composition of claim 1, wherein the at least one polymeric dispersant is selected from styrene-acrylic resins.

13. The composition of claim 1, wherein the at least one surfactant is selected from succinic acid esters and salts thereof.

14. The composition of claim 13, wherein the succinic acid esters are selected from alkylsulfosuccinic acid esters, alkylsulfosuccinates, and salts thereof.

15. The composition of claim 1, wherein the at least one attached organic group is selected from carboxylic acids, sulfonic acids, phosphonic acids, hydroxyls, amines, and esters, amides, and salts thereof.

16. The composition of claim 1, wherein the at least one attached organic group is selected from carboxylic acids.

17. The composition of claim 1, wherein the at least one attached organic group is selected from benzene carboxylic acid, benzene dicarboxylic acid, benzene tricarboxylic acid, benzene sulfonic acid, and salts thereof.

18. The composition of claim 1, wherein the carbon black is an oxidized carbon black.

19. The composition of claim 1, wherein the at least one polyurethane is prepared from a polyester polyol, a polyether polyol, a polyhydroxy polycarbonate, a polyhydroxy polyacetal, a polyhydroxy polyacrylate, a polyhydroxy polyester amide, a polyhydroxy polyolefin, a polyhydroxy polydialkylsiloxane, or a polyhydroxy polythioether.

20. The composition of claim 1, wherein the at least one polyurethane is prepared from a polyester polyol or a polyether polyol.

21. The composition of claim 1, wherein the at least one polyurethane is present in an amount ranging from about 0.1 to about 10.0% by weight based on the total weight of the composition.

22. The composition of claim 1, wherein the carbon black and the at least one polyurethane are present in a weight ratio ranging from about 10/1 to about 1/2.

23. The composition of claim 1, wherein the at least one polyurethane is anionically self-stabilizing and has:
  i) an acid number ranging from about 6 to about 70 mg KOH/g polyurethane; and
  ii) a percentage by weight of polyol ranging from about 50% to about 90%.

24. The composition of claim 1, wherein the at least one polyurethane has a molecular weight, Mw, ranging from about 10,000 to about 150,000 g/mol.

25. The composition of claim 1, wherein the at least one polyurethane is a poly(propylene glycol)-based polyurethane.

26. An inkjet ink composition comprising:
(a) a carbon black having the following properties:
  OAN≥170 mL/100 g; and
  STSA ranging from 160 to 220 $m^2/g$;
(b) at least one polymeric dispersant selected from polyoxyethylene/polyoxypropylene block copolymers, styrene-acrylic resins, styrene-methacrylic resins, styrene-maleic acid copolymers, and styrene-maleic anhydride copolymers;
(c) at least one surfactant selected from ethoxylated siloxanes, succinic acid esters, and succinic acid salts; and
(d) at least one polyurethane, wherein the at least one polyurethane is prepared from a polyester polyol, a polyether polyol, a polyhydroxy polycarbonate, a polyhydroxy polyacetal, a polyhydroxy polyacrylate, a polyhydroxy polyester amide, a polyhydroxy polyolefin, a polyhydroxy polydialkylsiloxane, or a polyhydroxy polythioether.

27. The composition of claim 26, wherein the at least one polyurethane is anionically self-stabilizing and has:
  i) an acid number ranging from about 6 to about 70 mg KOH/g polyurethane; and
  ii) a percentage by weight of polyol ranging from about 50% to about 90%.

28. An inkjet ink composition comprising:
(a) a carbon black having the following properties:
  OAN≥170 mL/100 g; and
  STSA ranging from 160 to 220 $m^2/g$;
(b) at least one polymeric dispersant selected from polyoxyethylene/polyoxypropylene block copolymers, styrene-acrylic resins, styrene-methacrylic resins, styrene-maleic acid copolymers, and styrene-maleic anhydride copolymers;
(c) at least one surfactant selected from ethoxylated siloxanes, succinic acid esters, and succinic acid salts; and
(d) at least one polyurethane, wherein the carbon black and the at least one polyurethane are present in a weight ratio ranging from about 10/1 to about 1/2.

29. The composition of claim 1, wherein the at least one polyurethane is anionically self-stabilizing and has:
  i) an acid number ranging from about 6 to about 70 mg KOH/g polyurethane; and
  ii) a percentage by weight of polyol ranging from about 50% to about 90%.

* * * * *